June 23, 1931.  J. R. HARRISON  1,811,126
BALANCED MAGNETOSTRICTIVE OSCILLATOR
Filed Dec. 11, 1928
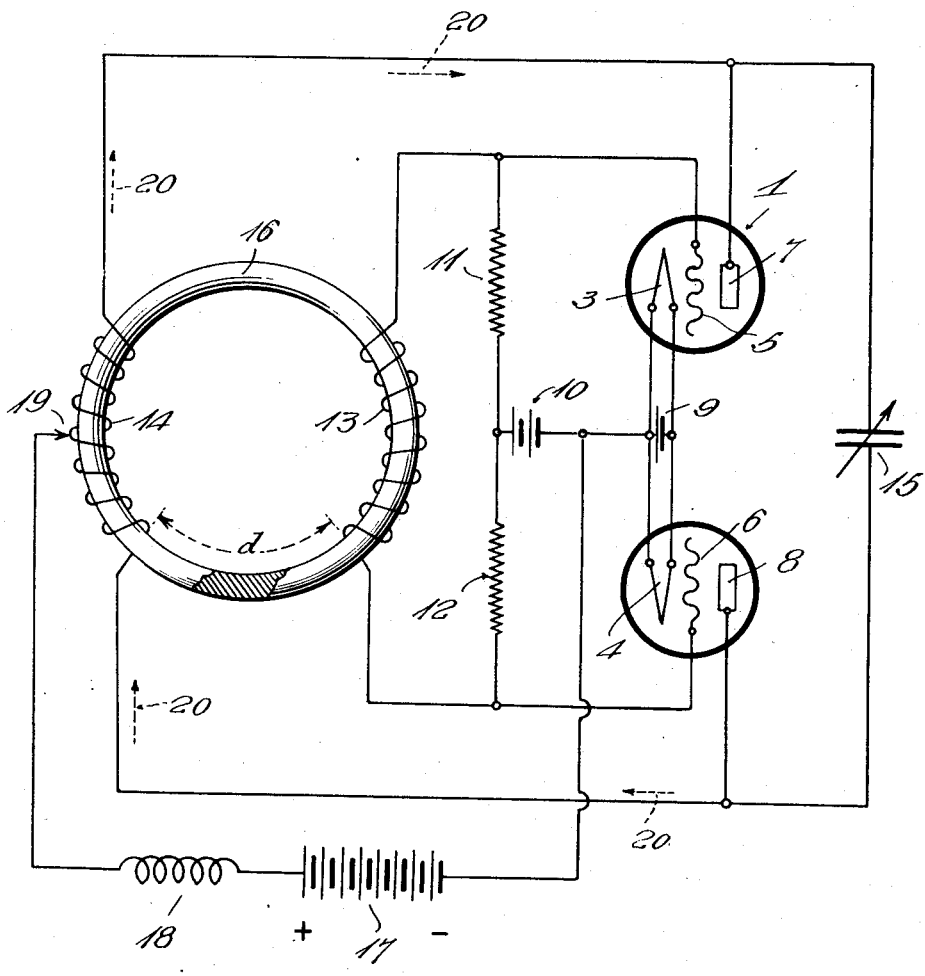
INVENTOR.
Jamison R. Harrison,
BY John C. Brady
ATTORNEY.

Patented June 23, 1931

1,811,126

UNITED STATES PATENT OFFICE

JAMISON R. HARRISON, OF MIDDLETOWN, CONNECTICUT, ASSIGNOR TO WIRED RADIO, INC., OF NEW YORK, N. Y., A CORPORATION OF DELAWARE

BALANCED MAGNETOSTRICTIVE OSCILLATOR

Application filed December 11, 1928. Serial No. 325,367.

My invention relates to circuit arrangements in general and more specifically to circuit arrangements for producing high frequency electrical energy.

An object of my invention is to provide a high frequency circuit arrangement wherein the generated energy has a constant and steady frequency.

Another object of my invention is to provide a circuit arrangement employing electrically balanced thermionic tubes and wherein the frequency of the generated energy is substantially uniform.

Still another object of my invention is to provide a circuit arrangement wherein a magneto-striction member is employed in combination with a balanced arrangement of thermionic tubes.

A better understanding of the circuit arrangement of my invention can be had by referring to the specification following and to the accompanying drawing which diagrammatically illustrates the circuit arrangement of my invention.

In the circuit arrangement shown in the accompanying drawing, a torus ring 16 possessing magneto-strictive properties is coupled to the input and output of an electrically balanced amplifier circuit by means of inductance coils 13 and 14 respectively. Because of the magneto-strictive properties of the torus ring 16, energy is transferred from the output coil 14 to the input coil 13 through the mechanically vibrating ring 16 whereby oscillations of electrical energy are sustained in the circuits.

The constants of coils 13 and 14, namely the size and shape, depend upon the size and shape of the ring 16 and are most easily determined empirically. The output coil 14 is shunted by the condenser 15 forming a tuned output circuit which is tuned approximately to the resonance frequency of torus ring 16. Coils 13 and 14 are so arranged that the distance "d" between them may be varied thus allowing proper adjustment of the phase relationship between input and output circuits for maximum power output. This is possible since the energy is transferred from the output to the input circuit by means of the mechanically vibrating torus ring 16 in the form of a wave motion.

The circuit is ordinarily nonoscillatory when the magnetostrictive torus ring 16 is removed from coils 13 and 14, since the windings of these coils are in the same direction. The circuit may be made self oscillatory without the presence of torus ring 16 by reversing the direction of the winding of either coil. With this latter arrangement, with the windings in opposite directions, the introduction of ring 16 will stabilize the circuit and maintain the frequency of the generated energy substantially uniform though the circuit constants may be varied over a considerable range. The source of anode supply energy 17 is connected to the anodes 7 and 8 of thermionic tubes 1 and 2 respectively through a center tap 19 on output coil 14. The choke coil 18 is an inductive reactance at the oscillation frequency of the circuit thus acting as a choke to exclude the oscillation currents from source of potential 17.

The currents in the output coil 14 are in such a direction at any given interval of time as to produce an additive effect. The direction of these currents for a given time are indicated by arrows 20. This may be best understood from the following consideration. Consider a wave motion traveling down the magnetostrictive ring 16. This causes a change in the circumference of the torus ring 16 and because of its magnetostrictive properties a magnetic field is set up in coil 13. This magnetic field induces a current in the coil. Let us assume that the current is in such a direction that a positive charge is impressed on control electrode 5 whereby the current at the anode 7 is increasing as shown by the arrows 20. At the same time a negative charge is impressed on control electrode 6 of thermionic tube 2 causing the current at anode 8 to diminish. As these currents flow into the output coil 14, they are in the same direction and produce an additive effect. A source of control electrode biasing potential 10 is connected to control electrodes 5 and 6 of thermionic tubes 1 and 2, respectively, through the resistors 11 and 12. Resistors 11 and 12 may be replaced by choke coils. Cathodes 3 and 4 of thermionic tubes 1 and 2 are energized from source 9. The temperature coefficient of the oscillation frequency of the circuit depends upon the nature of the magnetostrictive torus ring 16. The frequency can be made practically independent of temperature however by enclosing torus ring 16 and the coils 13 and 14 in a thermostatically controlled compartment. Higher frequencies can be obtained from this circuit by making use of the harmonics of the fundamental frequency characteristics of ring 16. This is accomplished by reversing the connections to either the output coil 14 or to the input coil 13 and adjusting the frequency characteristics of the output circuit to approximately the frequency of the desired harmonic energy. The distance "d" between inductance coils 13 and 14 should be carefully readjusted to obtain the proper phase relationship of the energy in the circuits for maximum power generated.

The circuit arrangement of my invention provides an electrically balanced thermionic tube generating system wherein the generated energy is of substantially uniform frequency. The great precautions necessary to employ when using a mechanically vibratile element such as quartz having piezo electric properties, is avoided and unnecessary when the magnetostriction element is employed. Torus ring 16 may comprise any suitable metal such as nickel, iron or alloys of chromium, iron or nickel, or any other metal or alloy possessing magnetostrictive properties. A rod may be employed in the place of the torus ring 16 shown in the accompanying drawing. The physical dimensions of the magnetostriction torus ring or rod are directly proportional to the wave length of the generated signaling energy or inversely proportional to the frequency.

I realize that many modifications of the circuit arrangement of my invention are possible without departing from the spirit of my invention as defined in the appended claims and it is to be clearly understood that the embodiments of my invention are not to be restricted to the foregoing specification or to the accompanying drawing but only as defined by the scope of the appended claims.

What I claim as new and desire to secure by Letters Patent of the United States is as follows:

1. An electrically balanced circuit arrangement comprising in combination a plurality of thermionic tubes having cathodes, anodes and control electrodes, input and output circuits interconnecting said electrodes, an inductance included in said input circuit, an inductance included in said output circuit, means for selectively tuning said output circuit and a torus ring of metal interlinking the axes of said inductances.

2. An electrically balanced circuit arrangement comprising in combination a plurality of thermionic tubes having cathodes, anodes and control electrodes, an output circuit interconnecting the cathode and control electrodes of said tubes an inductance coil connected in said input circuit, an output circuit interconnecting the anode and cathode electrodes of said tubes, a second inductance coil connected in said output circuit and a metallic toroidial member having magnetostrictive properties common to the electrical axes of each of said inductance coils and means for tuning one of said circuits.

3. An electrically balanced circuit arrangement comprising in combination a plurality of thermionic tubes having cathodes, anodes and control electrodes, an input circuit including the cathode and control electrodes of said tubes, an inductance coil, connected in said input circuit, an output circuit including the anode and cathode electrodes of said tubes, a second inductance coil connected in said output circuit, means for adjustably tuning said output circuit, a metallic toroidial member having magnetostrictive properties extending through the electrical axes of said inductance coil the physical dimension of said toroidial member being such as to give a free period of vibration of a frequency equal to the frequency to which said output circuit is adjusted.

4. An electrically balanced circuit arrangement comprising in combination a plurality of thermionic tubes having cathodes, anodes and control electrodes, an input circuit interconnecting the cathode and control electrodes of said tubes an inductance coil disposed in said input circuit, an output circuit interconnecting the anode and cathode electrodes of said tubes, a second inductance coil connected in said output circuit, means for tuning said output circuit, said coils being adjustably positioned in respect each to the other, and a metallic toroidial member coincident with the electrical axes of said inductance coils, said toroidial member being mechanically vibratile at a frequency within the frequency range of the tuning range of the tuning means in said output circuit.

5. An electrically balanced circuit arrangement comprising in combination a plurality of thermionic tubes having cathodes, anodes and control electrodes, an input circuit interconnecting the cathode and control electrodes of said tubes, an inductance coil connected in said input circuit, an output circuit including the anode and cathode electrodes of said tubes, a second inductance coil connected in said output circuit, tuning means connected between said anode electrodes, the spacial relation of said coils being adjustable, and a metallic toroidial member common with the electrical axes of said inductance coils, said toroidial member having magnetostrictive properties at a frequency within the tuning range of said tuning means.

6. An electrically balanced circuit arrangement comprising in combination a plurality of thermionic tubes having cathodes, anodes and control electrodes, an input circuit including, the anode and cathode electrodes of of said tubes, an inductance coil disposed in said input circuit, an output circuit including the anode and cathode electrodes of said tubes, a second inductance coil connected in said output circuit, a variable impedance element connected in parallel with said second inductance coil for tuning said output circuit to a selected frequency, a metallic toroidial magnetostrictive member common with the electrical axes of said inductance coils, the spacial relation of said coils being adjustable, and the physical dimensions of said toroidial magnetostrictive member being such as to give a free period of vibration equal to the tuned frequency of said output circuit.

In testimony whereof I affix my signature.

JAMISON R. HARRISON.